United States Patent
Van Leest et al.

(10) Patent No.: US 7,844,072 B2
(45) Date of Patent: Nov. 30, 2010

(54) WATERMARK EMBEDDING AND DETECTION OF A MOTION IMAGE SIGNAL

(75) Inventors: Adriaan Johan Van Leest, Eindhoven (NL); Johan Paul Marie Gerard Linnartz, Eindhoven (NL)

(73) Assignee: Civolution B.V., Eindhoven (NL)

( * ) Notice: Subject to any disclaimer, the term of this patent is extended or adjusted under 35 U.S.C. 154(b) by 933 days.

(21) Appl. No.: 10/542,837

(22) PCT Filed: Jan. 13, 2004

(86) PCT No.: PCT/IB2004/050010
§ 371 (c)(1),
(2), (4) Date: Jul. 20, 2005

(87) PCT Pub. No.: WO2004/066626
PCT Pub. Date: Aug. 5, 2004

(65) Prior Publication Data
US 2006/0129566 A1    Jun. 15, 2006

(30) Foreign Application Priority Data
Jan. 20, 2003    (EP)    .................................. 03100109

(51) Int. Cl.
*G06K 9/00* (2006.01)
(52) U.S. Cl. .................. 382/100; 382/250; 382/232; 713/176; 380/221; 380/238; 380/210; 380/218; 348/461; 348/463; 348/467
(58) Field of Classification Search ............ 380/7, 380/54, 201, 206, 239, 221, 238, 210, 218; 382/100, 232, 116, 119, 124, 182, 135, 212, 382/235, 251, 181; 348/473; 726/2, 27, 726/30; 713/168, 176; 358/328, 3.28; 700/39, 700/26, 27, 30, 38, 52, 58; 707/100
See application file for complete search history.

(56) References Cited

U.S. PATENT DOCUMENTS 5,991,426 A * 11/1999 Cox et al. .................... 382/100

(Continued)

FOREIGN PATENT DOCUMENTS

EP    0933919 A2    4/1999

(Continued)

OTHER PUBLICATIONS

Haitsma et al ( XP-001045619; A Watermarking scheme for digital cinema), IEEE 2001.*

(Continued)

*Primary Examiner*—Wesley Tucker
*Assistant Examiner*—Nancy Bitar
(74) *Attorney, Agent, or Firm*—Barnes & Thornburg LLP

(57) ABSTRACT

Methods and arrangements are disclosed for embedding and detecting a watermark in a cinema movie, such that the watermark can be detected in a copy made by a handheld video camera. The watermark embedder divides each image frame into two areas. A watermark bit '+1' is embedded in a frame by increasing the luminance of the first part and decreasing the luminance of the second part. A watermark bit '−1' is embedded by decreasing the luminance of the first part and increasing the luminance of the second part. It is achieved with the invention that the embedded watermark survives 'de-flicker' operations that are often used to remove flicker caused by the different frame rates of cinema projection equipment and consumer camcorders.

5 Claims, 3 Drawing Sheets

U.S. PATENT DOCUMENTS

| | | | |
|---|---|---|---|
| 6,477,431 B1 * | 11/2002 | Kalker et al. | 700/39 |
| 6,553,127 B1 * | 4/2003 | Kurowski | 382/100 |
| 6,590,996 B1 * | 7/2003 | Reed et al. | 382/100 |
| 6,807,285 B1 | 10/2004 | Iwamura | |
| 6,970,575 B2 * | 11/2005 | Echizen et al. | 382/100 |
| 7,188,248 B2 * | 3/2007 | Watson | 713/176 |
| 7,191,334 B1 * | 3/2007 | Kalker | 713/176 |
| 7,197,164 B2 * | 3/2007 | Levy | 382/100 |
| 7,369,677 B2 * | 5/2008 | Petrovic et al. | 382/100 |
| 7,430,302 B2 * | 9/2008 | Thorwirth | 382/100 |
| 7,706,569 B2 * | 4/2010 | Iwamura | 382/100 |
| 7,748,051 B2 * | 6/2010 | Morimoto et al. | 726/32 |
| 2004/0250079 A1 * | 12/2004 | Kalker et al. | 713/176 |
| 2005/0105726 A1 * | 5/2005 | Neubauer et al. | 380/201 |
| 2006/0129566 A1 * | 6/2006 | Van Leest | 707/100 |

FOREIGN PATENT DOCUMENTS

| | | |
|---|---|---|
| JP | 11289255 A | 10/1999 |
| WO | 9945705 A2 | 9/1999 |
| WO | 9945706 A2 | 9/1999 |
| WO | WO 99/45705 | 9/1999 |
| WO | 00/38097 A1 | 6/2000 |
| WO | WO/03/001813 * | 1/2003 |

OTHER PUBLICATIONS

Jaap Haitsma, et al: A Watermarking Scheme for Digital Cinema, IEEE Oct. 2001, pp. 487-489, XP001045619.
A Watermarking Scheme for Digital Cinema; Proceedings ICIP, vol. 2, 2001, pp. 487-489.
Jan. 22, 2010 Office Action for Japanese Patent Application No. 2006-500353.

* cited by examiner

WATERMARK EMBEDDING AND DETECTION OF A MOTION IMAGE SIGNAL

FIELD OF THE INVENTION

The invention relates to a method and arrangement for embedding a watermark in motion image signals such as movies projected in cinemas. The invention also relates to a method and arrangement for detecting a watermark embedded in such motion image signals.

BACKGROUND OF THE INVENTION

Watermark embedding is an important aspect of copy protection strategies. Although most copy protection schemes deal with protection of electronically distributed contents (broadcasts, storage media), copy protection is also desired for movies shown in theaters. Nowadays, illegal copying of cinema material by means of a handheld video camera is already common practice. Although the quality is usually low, the economical impact of illegal VHS tapes, CD-Videos and DVDs can be enormous. For this reason, cinema owners are obliged to prevent the presence of video cameras on their premises. Not following this rule may be sanctioned with a ban on the future availability of content. In view hereof, it is envisioned to provide that a watermark will be added during show time. The watermark is to identify the cinema, the presentation time, operator, etc.

Robustness to geometric distortions is a key requirement for such watermark embedding schemes. A handheld camera will not only seriously degrade the video by filtering (the optical path from the screen to the camera, transfer to tape, etc.) but also seriously geometrically distort the video (shifting, scaling, rotation, shearing, changes in perspective, etc.). In addition, these geometrical distortions can change from frame to frame.

A prior-art method of embedding a watermark in cinema movies, which meets the robustness requirements, is disclosed in Jaap Haitsma and Ton Kalker: A Watermarking Scheme for Digital Cinema; Proceedings ICIP, Vol. 2, 2001, pp. 487-489. The robustness to geometric distortions is achieved by exploiting only the temporal axis to embed the watermark. The watermark is a periodic pseudo-random sequence of watermark samples having two distinct values, e.g. '1' and '−1'. One watermark sample is embedded in each image. The value '1' is embedded in an image by increasing a global property (e.g. the mean luminance) of the image, the value '−1' is embedded by decreasing said global property.

The prior-art watermark embedding method actually embeds flicker. By embedding the same watermark sample in a number of consecutive images, the flicker is made imperceptible (the human eye is less sensitive to low-frequency flicker).

Flicker of the recorded movie is also caused by a) the typical mismatch between the cinema projector's frame rate (24 frames per second) and the camcorder's frame rate (25 fps for PAL, 29.97 fps for NTSC), and b) the difference between the two display scan formats (progressive vs. interlace). This kind of flicker is so annoying that de-flickering tools have been made widely available to the public. For example, a de-flicker plug-in for the video capturing and processing application "Virtualdub" has been found on the Internet.

A problem of the prior-art watermark embedding scheme is that de-flicker tools also remove the embedded watermark.

OBJECT AND SUMMARY OF THE INVENTION

It is an object of the invention to further improve the prior-art watermark embedding and detection method. It is a particular object of the invention to provide a watermark embedding and detection scheme, which is robust to de-flickering operations.

To this end, the method of embedding a watermark in a motion image signal according to the invention includes dividing each image into at least a first and a second image area. One value of a watermark sample is embedded in an image by increasing the global property (e.g. the mean luminance) of its first area and decreasing the global property of its second area. The other value of the watermark sample is embedded in the opposite way, i.e. by decreasing the global property of the first image area and increasing the global property of the second image area.

The invention exploits the insight that de-flickering tools remove flicker by adjusting the mean luminance of successive images to exhibit a low-pass character. The mean luminance is adjusted in practice by multiplying all pixels of an image by the same factor. Because this operation does not affect the (sign of the) modifications applied to the distinct image areas, the watermark information will be retained. In view hereof, the global property of an image area being modified to embed the watermark is the mean luminance of said image area.

In a preferred embodiment of the method, the first and the second image area are the upper and lower half of an image. In general, there are more horizontal than vertical movements in a movie. The horizontal movements influence the mean luminance values to a smaller extent.

DESCRIPTION OF EMBODIMENTS

Figure 1:
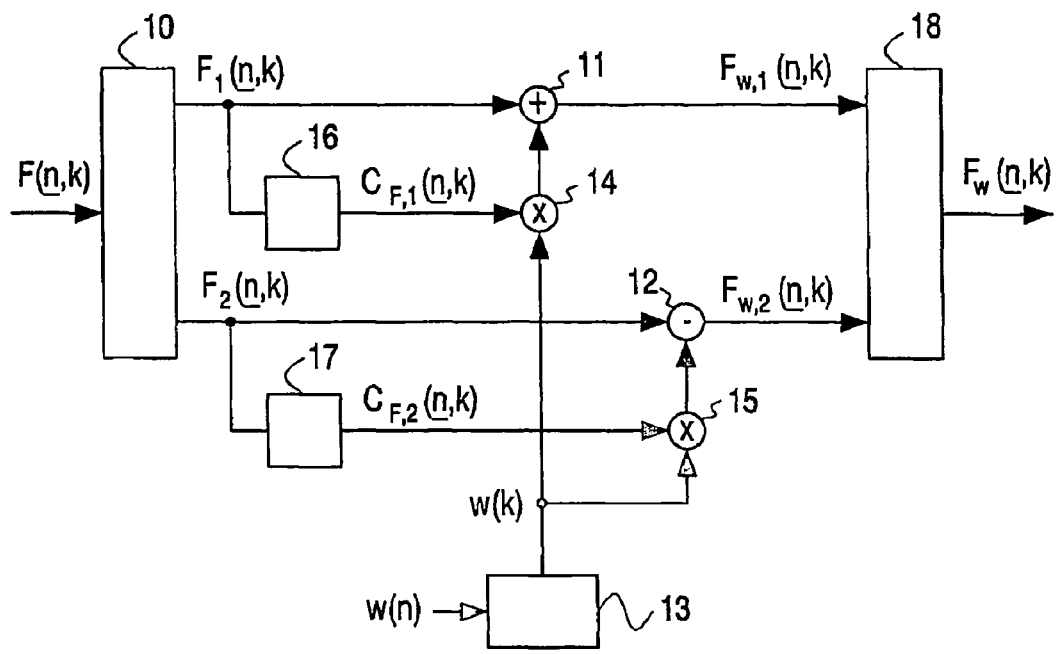
FIG. 1 is a schematic diagram of a watermark embedder in accordance with the invention.

FIG. 1 is a schematic diagram of a watermark embedder in accordance with the invention. The embedder receives a sequence of images or frames having a luminance $F(\underline{n},k)$ at spatial position $\underline{n}$ of frame k. The embedder further receives a watermark in the form of a pseudo-random sequence $w(n)$ of length N, where $w(n)\epsilon[-1, 1]$. An appropriate value of N for this application is N=1024. The arrangement comprises a dividing stage 10, which divides each image into a first (e.g. upper half) area and a second (e.g. lower half) area. The luminance of said image areas is denoted $F_1(\underline{n},k)$ and $F_2(\underline{n},k)$, respectively.

In the simplest embodiment of the watermark embedder, the sequence $w(n)$ is directly applied to embedding stages 11 and 12. In such an embodiment, embedding stage 11 adds one applied watermark sample $w(n)$ to every pixel of the first image area, whereas embedding stage 12 subtracts the same watermark sample from every pixel of the second image area.

Clipping is performed where necessary. The mean luminances of the first and second image areas are thus oppositely modulated by the watermark.

Other examples of global image properties that can be modulated by the watermark are picture histograms (a list of relative frequencies of luminance values in the picture), or features derived therefrom such as high order moments (average of luminance values to a power k). The mean luminance is a specific example of the latter (k=1).

Since the Human Visual System (HVS) is sensitive to flicker in low spatial frequencies, this simple embodiment may suffer from artifacts in especially non-moving flat areas. These artifacts are significantly reduced by lowering the flicker frequency of the watermark. This is performed by a repetition stage 13, which repeats each watermark sample during a predetermined number K of consecutive images. The same watermark sample is thus embedded in K consecutive frames. The watermark repeats itself every N=1024 frames. The watermark sample w(n) being embedded in frame k can be mathematically denoted by w($\lfloor k/K \rfloor$ mod N). For simplicity, this expression will hereinafter be abbreviated to w(k).

The preferred embodiment of the embedder which is shown in FIG. 1 further adapts the embedding depth in dependence upon the image contents. To this end, the embedder comprises multipliers 14 and 15, which multiply the watermark sample w(k) by a local scaling factor $C_{F,1}(\underline{n},k)$ and $C_{F,2}(\underline{n},k)$, respectively. The local scaling factors are derived from the image contents by image analyzers 16 and 17, respectively. For example, they are large in moving textured parts of an area and small in non-moving flat parts. The outputs of the embedding stages 11 and 12 can be formulated as:

$$F_{w,1}(\underline{n},k) = F_1(\underline{n},k) + C_{F,1}(\underline{n},k)w(k)$$

$$F_{w,2}(\underline{n},k) = F_2(\underline{n},k) - C_{F,2}(\underline{n},k)w(k)$$

It will be appreciated that both embedding operations can be carried out in a time-sequential manner by a single processing circuit under appropriate software control.

The two image areas are subsequently combined by a combining stage 18 into a single watermarked image $F_w(\underline{n},k)$.

Figure 2:
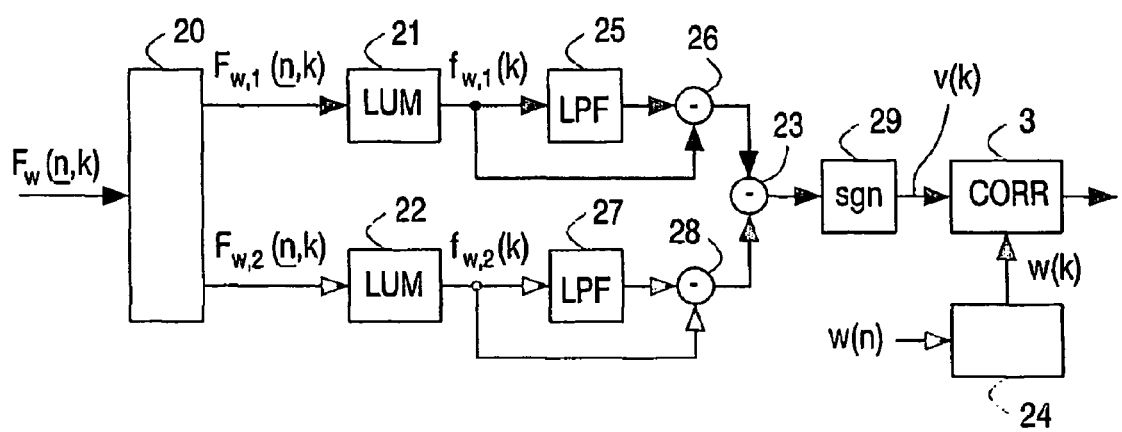
FIG. 2 is a schematic diagram of a watermark detector in accordance with the invention.

FIG. 2 is a schematic diagram of a watermark detector in accordance with the invention. Although the original signal is available during detection, the detector does not utilize any knowledge about the original. The arrangement receives a watermarked sequence of images or frames having a luminance $F_w(\underline{n},k)$ at spatial position $\underline{n}$ of frame k. The detector comprises a dividing stage 20, which divides each image into a first (e.g. upper half) area and a second (e.g. lower half) area in a similar manner as dividing stage 10 (FIG. 1) of the embedder. The luminance of each image area is denoted $F_{w,1}(\underline{n},k)$ and $F_{w,2}(\underline{n},k)$, respectively. For each image area, the detector further includes a mean luminance computing circuit 21, 22, which computes the mean luminance values $f_{w,1}(k)$ and $f_{w,2}(k)$ (or other global property, if applicable) of the respective image areas in accordance with:

$$f_{w,i}(k) = \frac{1}{N} \sum_{\underline{n}} F_{w,i}(\underline{n}, k)$$

In practice, the mean luminance values of a movie exhibit a low-pass nature as a function of the frame number k (i.e. as a function of time). The detector estimates the mean luminance values of the original (unwatermarked) movie by low-pass filtering (25,27) the respective mean luminance values $f_{w,1}(k)$ and $f_{w,2}(k)$. Estimations of the mean luminance modifications as introduced by the embedder are subsequently obtained by subtracting (26,27) the low-pass filtered mean values from the unfiltered mean luminance values. The detector estimates the embedded watermark sample by subtracting (23) both estimations, followed by a sign operation (29). The estimated watermark sample being embedded in frame k is denoted v(k).

The arrangement thus generates a sequence of estimated watermark samples. In a correlation stage 3, the estimated sequence of watermark samples is correlated with the watermark being looked for. The detector receives this watermark being looked for in the form of a pseudo-random sequence w(n) of length N, where w(n)∈[−1, 1]. The detector comprises a repetition stage 24, which is identical to same repetition stage 13 of the embedder. The repetition stage repeats each watermark sample during K consecutive images. The watermark repeats itself every N=1024 frames. The watermark samples being applied to the correlation stage 3 for frame are denoted w(k). Again, w(k) is an abbreviation for the mathematically more correct expression w($\lfloor k/K \rfloor$ mod N).

It should be noted that the low-pass filter/subtracter combinations 25,26 and 27,28, as well as the sign operation 29 are optional.

Figure 3:
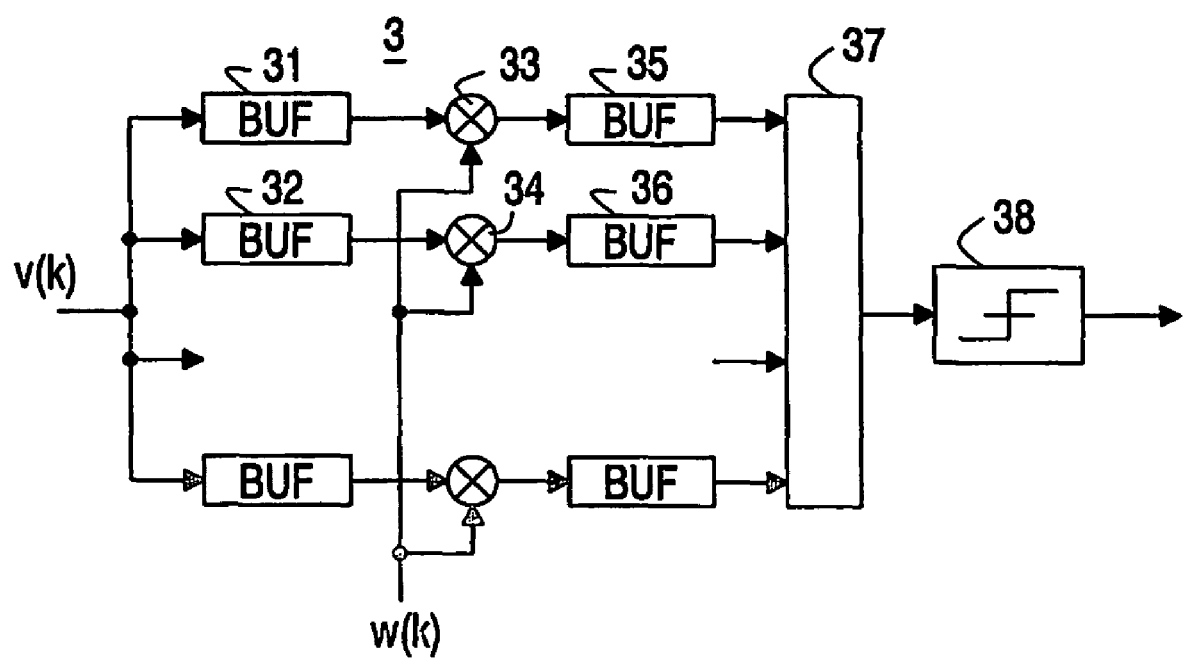
FIG. 3 is a schematic diagram of a correlation stage, which is an element of the watermark detector shown in FIG. 2.

FIG. 3 is a schematic diagram of the correlation stage 3. The estimated watermark samples of successive images are distributed to K buffers 31, 32, . . . , where, as described above, K is the number of consecutive images in which the same watermark sample is embedded. Each buffer stores N estimated watermark samples (or N computed mean luminance values, or N estimated mean luminance modification values). Typical values of the watermark length N and the frames per watermark sample K are 1024 and 5, respectively. Accordingly, the first buffer 31 contains estimated watermark samples v(1), v(6), v(11), . . . , the second buffer 32 contains v(2), v(7), v(12), . . . , etc. This implies that the granularity of watermark detection is approximately 3 minutes and 25 seconds for PAL video.

The watermark is detected by determining the similarity of the contents of each buffer with the reference watermark w(n) being looked for. Each watermark can identify, for instance, one theatre. A well-known example of similarity is cross-correlation, but other measures are possible. The contents of each buffer are cross-correlated with the reference watermark in respective correlators 33,34, . . . The correlation is preferably performed using Symmetrical Phase Only Matched Filtering (SPOMF). For a description of SPOMF, reference is made to International Patent application WO 99/45706. In said document, the correlation is performed in the two-dimensional spatial domain. Blocks of N×N image pixels are correlated with an N×N reference watermark. The result of the SPOMF operation is an N×N pattern of correlation values exhibiting one or more peaks if a watermark has been embedded.

The K correlators 33,34, . . . operate in the one-dimensional time domain. The output of each correlator is a series of N correlation values which is stored in a corresponding one of K buffers 35,36, . . . A peak detector 37 searches the highest correlation value in the K buffers, and applies said peak value to a threshold circuit 38. If the peak value of at least one of the buffers is larger than a given threshold value, it is decided that the watermark is present. Otherwise, the content will be classified as not watermarked.

A payload can be encoded in the signal by embedding shifted versions of the watermark w(n) in a manner similar to the one disclosed in International Patent Application WO-A-99/45705. It should further be noted that, although parallel correlators are shown in FIG. 3, it may be advantageous to carry out the respective operations in a time-sequential manner.

In order to describe the invention in even more details, a mathematical analysis of the prior-art watermarking scheme, an analysis of the publicly available de-flickering tool, and the operation of the watermarking scheme in accordance with the invention will now be given.

The watermark w is a periodic pseudo-random sequence containing only '1' and '−1' sample values with period M. A watermark sample w(n) is embedded in K consecutive frames k, k+1, ..., k+K−1. By embedding one watermark sample in K consecutive frames, the frequency of the flickering due to the embedding is decreased. A '1' is embedded in an image by increasing the luminance value of each pixel with a value $C_F(\underline{n},k)$. A '−1' is embedded by decreasing the luminance value of each pixel with $C_F(\underline{n},k)$. Herein, $\underline{n}$ is the spatial coordinate of a pixel within frame k. More mathematically, we have:

$$F_W(\underline{n}, k) = \begin{cases} F(\underline{n}, k) + C_F(\underline{n}, k) & \text{if } w\lfloor k/T \rfloor = 1 \\ F(\underline{n}, k) - C_F(\underline{n}, k) & \text{if } w\lfloor k/T \rfloor = -1 \end{cases}$$

where F is the frame to be embedded and $F_w$ is the embedded frame. The change $C_F$ is chosen to be such that the watermark is not visible, and therefore depends on F. In [2], a texture detector and a motion detector are used to determine $C_F$. As a result, the mean luminance values of the watermarked video $f_w$ $$f_w(k) = \frac{1}{N} \sum_{\underline{n}} F_w(\underline{n}, k)$$

with N being the number of pixels per frame, will exhibit a change with respect to the original mean luminance values $$f_w(k) = f(k) + c_F(k) w(\lfloor k/T \rfloor) \quad (1)$$

Herein, $c_F$ is the local depth of the watermark w, which is directly related to $C_F$:

$$c_F(k) = \frac{1}{N} \sum_n C_F(\underline{n}, k)$$

Figure 4A:
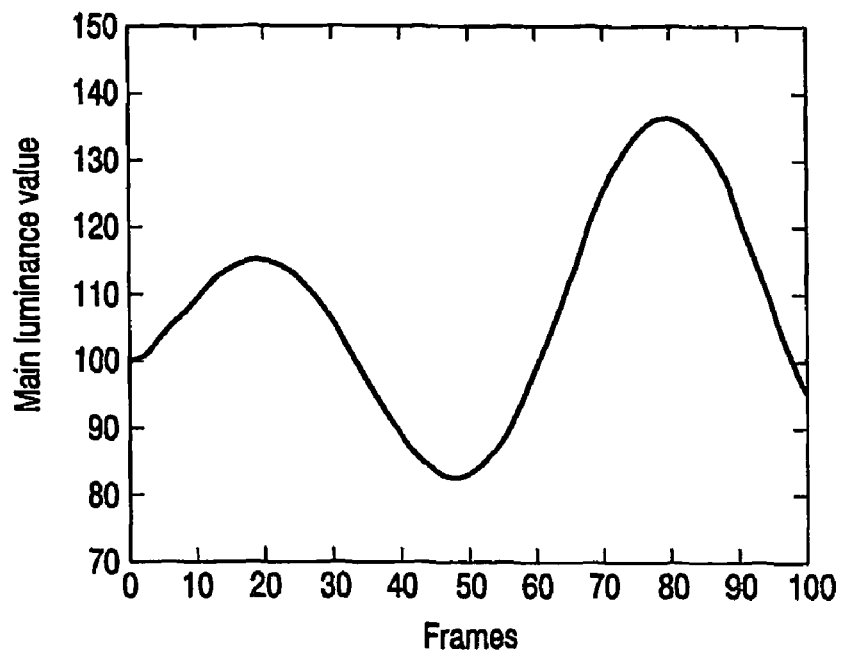
FIG. 4 shows graphs of the mean luminance values of an original image sequence and a watermarked image sequence.
Figure 4B:
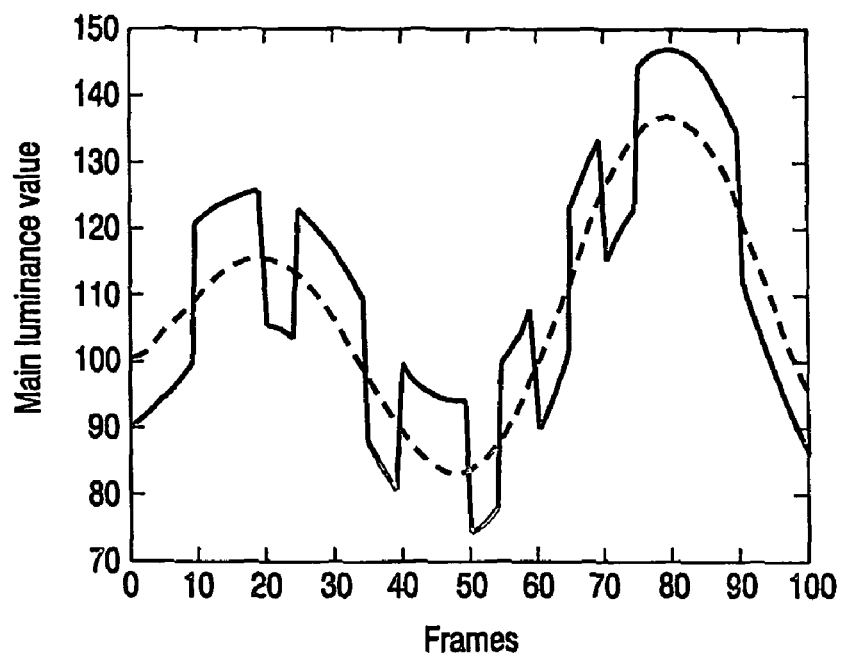

FIG. 4 shows, at (a), a graph of the mean luminance values of an original sequence and, at (b), a graph of the mean luminance values of an embedded sequence to visualize the watermark embedding concept.

Due to the watermark embedding, the mean luminance values will decrease or increase with respect to the original mean luminance values in time. See Eq. (1). In practice, the mean luminance values of a movie exhibit a low-pass nature. Therefore, the detector estimates these luminance values of the original unwatermarked movie by low-pass filtering the mean luminance values of the watermarked movie $f_w$. The detector estimates the watermark v by subtracting these low-pass filtered means from the mean luminance values of the watermarked movie $f_w$, followed by a sign operation. More mathematically, $$v(k) = \text{sign}\{f_w(k) - (f_w \otimes g)(k)\} \quad (2)$$

where $\otimes$ denotes a (one-dimensional) convolution, and g is a low-pass filter. Since a watermark sample is embedded in K consecutive frames, this operation yields K estimates $\tilde{w}_l$ of the watermark w:

$$\tilde{w}_l(k) = v(l + kK), 0 \leq l < K \quad (3)$$

Each of these K estimated watermarks $\tilde{w}_l$ is correlated with the original watermark w. If the absolute correlation value $d_l = |<w, \tilde{w}_l>|$ is larger than a threshold value, it is decided that the video sequence is watermarked.

A movie is projected progressively at a frame rate of 24 frames per second (fps), however, a standard video camera records at 25 fps (PAL) or 29.97 fps (NTSC) interlaced. Due to this interlacing, the luminance will not be the same throughout recording of one frame, as the shutter may just be opening or just be closing. Since the video camera and the projector are not synchronized, this problem is difficult to be solved for a camera man. In addition, since the frame rates of the projector and the video camera are not matched, a similar problem reveals itself; at some points in time, a frame is recorded when the shutter is half-open or even fully shut. The result of these mismatches is a flickering in the recorded movie.

A 'de-flicker' plug-in for Virtualdub can be found on the Internet. This plug-in removes the flickering in four steps:

In a first pass, it calculates the mean luminance values $\tilde{f}_w$ of the movie;

Subsequently, it filters these means $\tilde{f}_w$ with a low-pass filter h (default is a simple averaging filter of length 12);

Then it calculates factors β(k) between the original means $\tilde{f}_w(k)$ and the filtered means for each frame:

$$\beta(k) = \frac{(\tilde{f}_w \otimes h)(k)}{\tilde{f}_w(k)}$$

In a second pass, the luminance value of each pixel in frame k is multiplied by the corresponding factor β(k) rounded to the nearest integer, and clipped if it exceeds the maximum luminance value 255.

Note that β(k) is non-negative for all k, since $\tilde{f}_w(k) \geq 0$ and h is a low-pass filter. If we ignore the rounding and the clipping for the moment, the result of these multiplications in the last step is that the means of the new constructed video $\tilde{f}_{w,deflic}$ resembles the low-pass filtered means of $\tilde{f}_w$:

$$f_{w,deflic} = \beta(k) f(k) = (f_w \otimes h)(k)$$

Perceptually, this means that the new constructed video exhibits less flickering, because flickering can be seen as a high-frequency component in the mean luminance values of the frames, which are now filtered out.

Unfortunately, the watermarking scheme is actually a flickering, although imperceptible. As a direct consequence, this 'de-flicker' plug-in removes the watermark. The watermark embedding scheme must thus be modified in such a way that it is robust to de-flickering. This is all the more true as this 'de-flicker' tool is widely used to undo the pirate copies from the flickering.

To this end, each frame is divided into two parts (e.g. left/right or top/bottom), and the watermark sample is embedded in these parts in an opposite way. To embed a watermark sample, the mean luminance of one part is increased and the mean luminance of the other part is decreased. Consequently, the mean luminance values $f_w$ of the watermarked movie now consist of two parts $$f_w(k)=f_{w,1}(k)+f_{w,2}(k)$$

with (cf. Eq. (1))

$$f_{w,1}(k)=f_1(k)+c_{F,1}(k)w(\lfloor k/T \rfloor) \text{ and}$$

$$f_{w,2}(k)=f_2(k)-c_{F,2}(k)w(\lfloor k/T \rfloor) \quad (4)$$

After capturing with a camera, the 'de-flicker' tool removes the flickering by low-pass filtering the mean luminance values $\hat{f}_w$:

$$f_{w,deflic}(k)=\beta(k)\lfloor f_{w,1}(k)+f_{w,2}(k) \rfloor$$

The detection of the watermark for the modified watermarking scheme is similar to the detection method described above. First, the detector estimates the luminance values of the original unwatermarked movie for both parts by low-pass filtering the mean luminance values of both parts. Then it subtracts the result of both operations from the luminance values of the corresponding parts. Finally, it makes an estimate of the watermark $\tilde{v}$ by subtraction followed by a sign operation (cf. Eq. (2)):

$$\tilde{v}(k)=\text{sign}\{(f_{w,1,deflic}(k)-(f_{w,1,deflic} \otimes g)(k)-(f_{w,2,deflic}(k)-(f_{w,2,deflic} \otimes g)(k))\} \quad (5)$$

The K estimations $\tilde{w}_1$ (see Eq. (3)) are obtained in a similar way and correlated with the watermark w.

The embedded watermark survives the de-flicker operation because the de-flicker tool multiplies all the pixels of an image by the same factor $\beta(k)$, thereby leaving the luminance differences between the two image areas substantially intact The effect of the invention can also be explained more mathematically. It is assumed that the original unwatermarked movie exhibits a low-pass nature. After capturing of the movie with a camera, the mean luminance values of the watermarked parts $\hat{f}_{w,1}$ and $\hat{f}_{w,2}$ exhibit a flickering $$\hat{f}_{w,1}(k)=\gamma(k)f_{w,1}(k) \text{ and}$$

$$\hat{f}_{w,2}(k)=\gamma(k)f_{w,2}(k)$$

Herein, $\gamma(k)>0$ corresponds to the change in the mean luminance value (the flickering) of frame k. The 'de-flicker' plug-in removes this flickering by low-pass filtering the mean luminance values $$f_{w,deflic}(k)=\beta(k)$$
$$\hat{f}_w(k)=\beta(k)\gamma(k)[f(k)+\{c_{F,1}(k)-c_{F,2}(k)\}w(\lfloor k/T \rfloor)] \approx f(k).$$

From this expression it follows that $$\beta(k)\gamma(k) \approx \frac{f(k)}{f(k)+\{c_{F,1}(k)-c_{F,2}(k)\}w(\lfloor k/T \rfloor)}$$

Since in practice $\{c_{F,1}(k)-c_{F,2}(k)\}w(\lfloor k/T \rfloor)$ is relatively small compared to $f_{(k)}$, we can approximate $\beta(k)\gamma(k)$ by 1. By using this approximation, we see that $$\hat{f}_{w,1,deflic}(k)=\beta(k)\gamma(k)f_{w,1}(k) \approx f_{w,1}(k)=f_1(k)+c_{F,1}(k)w(\lfloor k/T \rfloor)$$

For the other part, we obtain a similar result $$\hat{f}_{w,2,deflic}(k) \approx f_2(k)-c_{F,2}(k)w(\lfloor k/T \rfloor)$$

Using these results, we finally obtain the following expression for $\tilde{v}$ (see Eq. (5))

$$\tilde{v}(k) \approx \text{sign}\{f_1(k) - f_2(k) + \lfloor c_{F,1}(k) + c_{F,2}(k) \rfloor w(\lfloor k/T \rfloor) - [f_1(k) - f_2(k)]\} =$$
$$\text{sign}\{[c_{F,1}(k) + c_{F,2}(k)]w(\lfloor k/T \rfloor)\} = \text{sign}\{w(\lfloor k/T \rfloor)\}$$

where it is assumed that the low-pass filter g completely filters out the watermark. Note that $c_{F,1}(k)+c_{F,2}(k)$ does not influence the sign of the expression, because it is non-negative for all k. It can be seen from this expression that the watermark indeed survives the 'de-flicker' operation after the modification.

Methods and arrangements are disclosed for embedding and detecting a watermark in a cinema movie, such that the watermark can be detected in a copy made by a handheld video camera. The watermark embedder divides each image frame into two areas. A watermark bit '+1' is embedded in a flame by increasing the luminance of the first part and decreasing the luminance of the second part. A watermark bit '−1' is embedded by decreasing the luminance of the first part and increasing the luminance of the second part. It is achieved with the invention that the embedded watermark survives 'de-flicker' operations that are often used to remove flicker caused by the different frame rates of cinema projection equipment and consumer camcorders.

The invention claimed is:

1. A method of embedding a watermark in a motion image signal, the motion image signal comprising a sequence of images, the method comprising:
   representing the watermark by a sequence of watermark samples each having a value;
   dividing an image of the sequence of images into at least a first and a second image area;
   modifying the image in accordance with a watermark sample from the sequence of watermark samples, the modification comprising adding the watermark sample value to the luminance value of pixels of the first image area and subtracting the watermark sample value from the luminance value of pixels of the second image area to oppositely modify the mean luminances of the first and second image areas in accordance with the watermark sample; and
   for each of the sequence of watermark samples, repeating the dividing an image of the sequence of images and modifying of the image in accordance with a watermark sample from the sequence of watermark samples such that each watermark sample oppositely modifies the mean luminances of the first and second image areas of a different image of the sequence of images until the entire watermark is embedded.

2. The method of claim 1, wherein the image modifying comprises modifying a series of consecutive images in accordance with the same watermark sample.

3. The method of claim 1, wherein the first and second image areas are the upper and lower of an image halves, respectively.

4. The method of claim 1, wherein the first and second image areas are the left and right of an image halves, respectively.

5. An arrangement for embedding a watermark in a motion image signal, the motion image signal comprising a sequence of images, the arrangement comprising:
   means for representing the watermark by a sequence of watermark samples each having a value;

means for dividing an image of the sequence of images into at least a first and a second image area; and image modifying means being arranged for modifying the image in accordance with a watermark sample from the sequence of watermark samples, the modification comprising adding the watermark sample value to the luminance value of pixels of the first image area and subtracting the watermark sample value from the luminance value of pixels of the second image area to oppositely modify the mean luminances of the first and second image areas in accordance with the watermark sample, wherein, the modifying means is further arranged to repeat the dividing an image of the sequence of images and modifying of the image for each of the sequence of watermark samples in accordance with a watermark sample from the sequence of watermark samples such that each watermark sample oppositely modifies the mean luminances of the first and second image areas of a different image of the sequence of images until the entire watermark is embedded.

\* \* \* \* \*